Patented Mar. 7, 1939

2,149,966

UNITED STATES PATENT OFFICE 2,149,966

ADDING NITROGEN VALUES TO SUPERPHOSPHATE

Walter H. Kniskern, Petersburg, Va., and Leonard V. Rohner, Syracuse, N. Y., assignors, by mesne assignments, to The Solvay Process Company, New York, N. Y., a corporation of New York No Drawing. Application October 2, 1935, Serial No. 43,218

5 Claims. (Cl. 71—43)

This invention relates to calcium nitrate-ammonia compositions, to processes for their preparation and to the production of fertilizers employing ammoniacal solutions of calcium nitrate. The invention further relates to a transportable package containing a calcium nitrate-ammonia composition.

The methods for the fixation of atmospheric nitrogen in the form of ammonia make available large amounts of fixed nitrogen for industrial purposes, particularly for the production of fertilizers. The ammonia may be utilized as gaseous, liquid or aqua ammonia, or it may be oxidized to nitrogen oxides and these oxides absorbed in alkaline materials such as calcium carbonate or calcium hydroxide (milk of lime) to produce nitrate salts which are valuable constituents of fertilizer mixtures.

The marketing of ammonia in the form of liquid ammonia or of aqua ammonia is, however, attended by difficulties and expensive operations. The liquid ammonia has relatively high vapor pressures at ordinary temperatures requiring the use of high pressure equipment and necessitating precautions to prevent the loss of ammonia during shipment and use. If the ammonia is prepared in the form of aqua ammonia, on the other hand, the transportation and handling costs of the aqua ammonia are largely expended for the relatively large proportion of valueless water contained in the solution. Again, in producing calcium nitrate by the absorption of nitrogen oxides in calcium carbonate or milk of lime or by first absorbing the oxides as nitric acid and then reacting the nitric acid with a calcium base, the product formed is a solution of calcium nitrate from which the water must be evaporated in order to obtain the solid salt. The evaporation and solidification of solutions of calcium nitrate is difficult and expensive since the concentrated solutions of calcium nitrate are dehydrated only with difficulty and the liquid calcium nitrate obtained is a viscous material which readily supercools before solidifying and, after solidifying, has the property of caking and avidly absorbing moisture from the atmosphere to form hydrates which make its transportation and storage difficult.

It is frequently desirable to prepare fertilizers containing nitrogen as well as $P_2O_5$ derived from phosphate materials such as superphosphate. It has been proposed to prepare such fertilizers by treating a monocalcium acid phosphate material such as superphosphate or triple superphosphate with ammonia in amounts at least sufficient to neutralize the free acid of the superphosphate and react with a substantial proportion of the water soluble phosphates in the superphosphate and thus impart a substantial proportion of nitrogen to the resulting fertilizer product. When the ammonia is added to the superphosphate in considerable amounts, however, it tends to cause water soluble and citrate soluble $P_2O_5$ in the superphosphate to be transformed into a citrate insoluble form which is not considered available as a plant food. There is, therefore, a limit in the amount of nitrogen which may be added to a superphosphate by means of basic ammonia without causing excessive reversion of the $P_2O_5$ and, for certain purposes, it is desirable to prepare fertilizers containing more nitrogen than may be practicably obtained by ammoniating a superphosphate.

It is, accordingly, an object of this invention to provide a composition of matter which comprises both calcium nitrate and ammonia suitable for use in the preparation of fertilizers and which contains the ammonia and calcium nitrate in a form advantageous for its transportation and handling. Another object of the invention is to provide a process for the preparation for transportation of ammonia and calcium nitrate, both of which are available at nitrogen fixation plants, which obviates many of the difficulties at present encountered in the preparation and transportation of these materials. It is a further object of this invention to provide a process for the production of mixed fertilizers by the treatment of a solid acidic fertilizer material with the ammoniacal calcium nitrate compositions described herein. Particularly, it is an object of the invention to provide a process for the production of phosphorus-nitrogen fertilizers containing a high proportion of nitrogen by treating a monocalcium acid phosphate material, for example, superphosphate or triple superphosphate, with a liquid composition comprising calcium nitrate and ammonia. Other objects of the invention will appear hereinafter.

We have discovered that the solubility of calcium nitrate in water at temperatures of about 0° C. is but little affected as ammonia is introduced into the solution. Thus, water at 0° C. dissolves about an equal weight of calcium nitrate so that a saturated aqueous solution of calcium nitrate in water at this temperature contains about 50% $Ca(NO_3)_2$. As ammonia is introduced into the water it has but a relatively small effect upon the solubility of the calcium nitrate. Thus solutions of calcium nitrate, saturated at 0° C. in 30% aqua ammonia (a solution of ammonia in water containing 30% NH₃) contains about 47% Ca(NO₃)₂ and in 50% aqua ammonia contains about 50% Ca(NO₃)₂. As the concentration of the ammonia in the aqua ammonia is increased above 50%, there is but a small falling off in the solubility of the calcium nitrate. Thus, at 0° C. a saturated solution of calcium nitrate in 82% aqua ammonia (a solution of ammonia in water containing 82% NH₃) contains about 45% Ca(NO₃)₂, and anhydrous liquid ammonia saturated with calcium nitrate at 0° C. contains about 46% Ca(NO₃)₂.

The solutions of calcium nitrate in aqua ammonia which are substantially saturated at about 0° C. are advantageous as a means for the transportation of ammonia and calcium nitrate since they remain liquid without salting out a solid material under the influence of changing atmospheric temperature conditions ordinarily encountered or, if some precipitation should occur at extremely low temperatures such as might occur in the winter time, any precipitate formed may be redissolved upon a slight warming of the liquor. These solutions, accordingly, present no difficulties in their handling or addition to superphosphate materials by, for example, spraying them onto the superphosphate to obtain their thorough dissemination throughout the material. The solutions lend themselves readily to being sprayed through ordinary spraying devices without clogging of the sprayer by crystallization of solid material from the solutions under ordinary operating conditions. A further advantage of these solutions saturated at about 0° C. is that throughout the range of varying proportions of ammonia and water the amount of calcium nitrate dissolved in the solution remains substantially constant, and accordingly, the trade may be supplied with a liquor containing varying amounts of basic ammonia, in accordance with its requirements for the treatment of superphosphate, in which the percentage of calcium nitrate is substantially constant. Thus, uniformity in the addition of calcium nitrate to the superphosphate may be readily maintained as the requirements with respect to the addition of ammonia may be varied.

A particular advantage of this invention is that ammoniacal solutions of calcium nitrate may be prepared which are saturated at about 0° C. and at the same time contain a high nitrogen content, a substantial proportion of which is present as calcium nitrate. Thus, the above described solution of calcium nitrate in 82% aqua ammonia saturated at 0° C. contains 44.8% nitrogen and about equal proportions of calcium nitrate and ammonia. The above described solution of calcium nitrate in anhydrous liquid ammonia saturated at 0° C. contains 52.4% nitrogen and 46 parts of calcium nitrate to 54 parts of ammonia. In making solutions containing a high proportion of nitrogen (e. g. about 40% to about 52% nitrogen) about 45 parts of calcium nitrate to about 40 to about 55 parts of ammonia and sufficient water to make a total of 100 parts of solution are employed.

Not only the solutions of calcium nitrate in aqua ammonia which are substantially saturated at about 0° C., but also solutions containing more or less calcium nitrate, such as solutions substantially saturated at a temperature between about —30° C. and about 30° C., have the advantage in their transportation and handling of relatively low vapor pressures as compared to ammoniacal liquids containing no calcium nitrate in solution. The presence of the calcium nitrate lowers the vapor pressure of the ammoniacal liquid to a marked extent, so that by dissolving calcium nitrate in an ammoniacal liquid which has vapor pressures materially above atmospheric at naturally prevailing temperatures, the vapor pressure at these temperatures may be substantially lowered. Thus, a solution of calcium nitrate in about 76% aqua ammonia and containing about 47% Ca(NO₃)₂ has vapor pressures of 1.6 and 4.3 atmospheres absolute at temperatures of 0° C. and 30° C., respectively, whereas an aqua ammonia of 76% NH₃ has vapor pressures of 3.1 and 8.4 atmospheres absolute at 0° C. and 30° C., respectively. Again, a solution of calcium nitrate in about 50% aqua ammonia containing 50% Ca(NO₃)₂ has vapor pressures at 0° C. of 0.4 atmosphere absolute and at 30° C. of 1.0 atmosphere absolute, whereas a 50% aqua ammonia containing no calcium nitrate has vapor pressures of 1.2 atmospheres absolute at 0° C. and 3.6 atmospheres absolute at 30° C.

The use of solutions of calcium nitrate in ammoniacal liquors as a means for the transportation and storage of calcium nitrate and ammonia obviates the difficulties arising in the marketing of solid calcium nitrate because of the property the solid salt has of absorbing moisture from the atmosphere and caking together when stored, which necessistates a distintegration of the caked mass before it may be utilized for the production of fertilizers. The liquid calcium nitrate-ammonia compositions, on the other hand, may be readily utilized in the treatment of solid fertilizer materials containing superphosphate by mixing the liquid with the solids, for example, by spraying the liquid onto the solid material while it is being agitated in a mixing machine. As noted above, it is preferred to employ solutions of calcium nitrate-ammonia which do not salt out at temperatures above about 0° C. since these solutions will not throw down a precipitate of solid material at ordinary temperatures or present difficulties in their use in spraying and mixing equipments.

The calcium nitrate compositions of this invention may be readily transported in a transportable package comprising a container made of a ferrous metal such as iron or steel (carbon steel or alloy steel), with the liquid composition in contact with the ferrous metal. Due to the material lowering of the vapor pressures of ammoniacal liquids by dissolving calcium nitrate therein, the containers in which the liquids are shipped are not subjected to the relatively higher vapor pressures of the ammoniacal liquids themselves. In many cases relatively high vapor pressures of ammoniacal liquids at ordinary atmospheric temperatures which, without calcium nitrate being present, are materially above atmospheric, may be lowered by dissolving calcium nitrate in the ammoniacal liquid, to such an extent as to permit the liquid being transported and handled in low pressure containers, whereas an ammoniacal liquid of corresponding composition without this material dissolved in it would require special equipment for its transportation.

The calcium nitrate-ammonia solutions of this invention may be transported or stored in containers in which the solution is in contact with a ferrous metal such as iron or steel. It is a particular advantage of these solutions that they have little corrosive action on such metals, whereas ammoniacal salt solutions in general corrode such metals relatively rapidly unless special precautions are taken which are not required in the case of the calcium nitrate-ammonia solutions of this invention.

The calcium nitrate-ammonia solutions may be conveniently prepared, for example, by introducing ammonia as a gas or anhydrous liquid or as concentrated aqua ammonia into a solution or slurry of calcium nitrate or by dissolving solid calcium nitrate containing more or less water in liquid ammonia or in an aqua ammonia of suitable strength. These solutions may be particularly advantageously prepared from the liquid anhydrous ammonia or concentrated aqua ammonia liquors obtained from a synthetic ammonia process and the solutions of calcium nitrate obtained by reacting nitrogen oxides or nitric acid with calcium carbonate or milk of lime. If desired, gaseous or anhydrous liquid ammonia or concentrated aqua ammonia may be introduced into a solution of calcium nitrate thus obtained, or the calcium nitrate solution may be evaporated to drive off more or less of its water content before being treated with the ammonia. Again, the calcium nitrate solution may be concentrated to crystallize out solid calcium nitrate and the crystalline product, without special drying treatment, may be dissolved in liquid ammonia, aqua ammonia or used for the absorption of gaseous ammonia. Further, solutions of calcium nitrate in ammonia may be prepared by treating calcium compounds, such as rock phosphate, with nitrogen oxides or nitric acid to produce the corresponding acid or acidic calcium salts and calcium nitrate, which materials may be treated with ammonia and the ammoniacal solution of the calcium nitrate together with other soluble salts separated from the insoluble materials by filtration or other means.

This invention provides particular advantages in the preparation of a marketable material from aqueous solutions of calcium nitrate. In starting with such a solution it may be concentrated until it contains about 75% or more calcium nitrate and about 25% or less water. Ammonia is then added to the solution in amount such that the sum of the parts of ammonia and of water in the resulting product is about 55 parts for every 45 parts of calcium nitrate. The ammonia may be absorbed as gas in the concentrated calcium nitrate solution or may be added thereto as liquid anhydrous ammonia or as a concentrated aqua ammonia. The product thus obtained is a liquid composition saturated with calcium nitrate at about 0° C. and contains a high percentage, 40% or more, of nitrogen. This method for preparing the liquid compositions has the advantages that the calcium nitrate solution need not necessarily be evaporated far enough to drive off all its water content or, in case it is desirable to make an anhydrous product, it is not necessary to solidify highly concentrated melts of calcium nitrate in order to put them in a marketable condition.

This invention further permits of producing calcium nitrate in a marketable form by reaction of nitrogen oxides or nitric acid with basic calcium materials without necessitating a close control of the acidity of the product formed, such as is required where solid calcium nitrate is to be shipped, in order to obtain a non-acid product which will not attack the containers for the solid. Where the compositions of this invention are used for the transportation of the calcium nitrate, the solutions of calcium nitrate prepared by reaction of nitrogen oxides or nitric acid with basic materials may have any degree of acidity which may be desired from the standpoint of the formation of the calcium nitrate and any free acid in the solution of calcium nitrate is then neutralized by the ammonia used in making up the calcium nitrate-ammonia compositions. The ammonia reacting with the free nitric acid in the calcium nitrate forms ammonium nitrate which is a valuable fertilizer ingredient and hence the ammonia used for neutralization of the excess free acids, instead of representing a loss of material, is in a form in which it is a desirable addition to the fertilizer mixtures.

The production of the compositions of this invention is particularly adapted to the fixed nitrogen industry wherein ammonia and calcium nitrate may all be produced in the same plant. These products may thus be shipped to the trade as a single homogeneous liquid.

The following examples are illustrative of methods for the preparation of the calcium nitrate-ammonia compositions of this invention and of the production of fertilizers employing calcium nitrate-ammonia solutions but the invention is not limited to these examples or to the particular details described. Whenever the word "parts" is used, it refers to parts by weight.

*Example I.*—A substantially anhydrous calcium nitrate-ammonia composition may be prepared by mixing about 85 parts of substantially anhydrous calcium nitrate with 100 parts of anhydrous liquid ammonia. This composition will not salt out at temperatures above about 0° C.

*Example II.*—A calcium nitrate-ammonia-water composition may be prepared by mixing about 100 parts of calcium nitrate di-hydrate (Ca(NO$_3$)$_2$.2H$_2$O) with about 41 parts of anhydrous ammonia and 23 parts of water. The composition thus prepared will not salt out at temperatures above about 0° C. At 30° C. the solution has a vapor pressure of about 1.1 atmospheres absolute which is equivalent to the vapor pressure of about a 30% aqua ammonia at 30° C., whereas the proportions of water and ammonia in the solution are equivalent to a 50% aqua ammonia.

The solutions of Examples I and II may be utilized for the production of a fertilizer by mixing the desired proportions of the solutions with superphosphate or triple superphosphate.

*Example III.*—A solution of calcium nitrate in water is evaporated until the composition contains about 9 parts of water for every 42 parts of calcium nitrate calculated as anhydrous (Ca(NO$_3$)$_2$ At temperatures below about 51.3° C. the composition thus obtained will, if supercooling does not occur, completely solidify forming calcium nitrate di-hydrate. About 51 parts of this composition are then mixed with about 40 parts of anhydrous ammonia. Any precipitate of impurities from this solution may be filtered off, if desired. The solution thus obtained does not salt out at temperatures above about 5° C.

The above described calcium nitrate-ammonia-water composition may be used for the preparation of a fertilizer by mixing about 91 parts of the solution with a mixture containing the following ingredients:

|  | Parts |
|---|---|
| Superphosphate (18% P$_2$O$_5$) | 890 |
| Ammonium sulfate | 190 |
| Potassium sulfate (50% K$_2$O) | 160 |
| Sand | 669 |

The resulting fertilizer mixture contains about 4% N, 8% P$_2$O$_5$ and 4% K$_2$O. The mixture is in good physical condition immediately after preparation and also after cooling. The mixture is not hygroscopic as is shown by the fact that it loses moisture when exposed at 30° C. to an atmosphere of 60% relative humidity.

*Example IV.*—A solution of about 77 parts of Ca(NO$_3$)$_2$.4H$_2$O in about 40 parts of anhydrous ammonia and about 17 parts of water is prepared. This solution contains about 53.5 parts of calcium nitrate to 40 parts of ammonia to 40 parts of water. It is utilized for the preparation of a complete fertilizer mixture in the following manner: About 135 parts of the solution are sprayed onto a mixture containing the following ingredients:

| | Parts |
|---|---|
| Superphosphate (18% P$_2$O$_5$) | 890 |
| Ammonium sulfate | 181 |
| Potassium sulfate (50% K$_2$O) | 160 |
| Sand | 635 |

The resulting mixture is in good physical condition. It contains about 4% N, 8% P$_2$O$_5$ and 4% K$_2$O.

If desired, additional materials such as urea, ammonium nitrate, ammonium chloride, sodium nitrate, potassium nitrate, etc. or any two or more of these materials, which in themselves are valuable fertilizers, may be incorporated with the calcium nitrate-ammonia solutions before they are added to the phosphate material, or they may be incorporated with the phosphate material before or after the treatment with the calcium nitrate-ammonia liquor. If it is desired to include in the fertilizer mixture salts such as ammonium phosphate, ammonium sulfate, etc., which form a precipitate with calcium nitrate, it is preferable to add these materials to the superphosphate either before or after the addition of the calcium nitrate-containing solutions of this invention rather than to the solutions themselves.

This application is a continuation in part of our copending application Serial No. 652,924, filed January 21, 1933, now United States Patent No. 2,022,675, granted December 3, 1935.

We claim:

1. In a process for producing a fertilizer by ammoniating superphosphate with an ammoniacal liquid added to the superphosphate in amount at least sufficient to neutralize the free acid and react with a substantial proportion of the water soluble phosphates of the superphosphate and thus impart a substantial proportion of nitrogen to the resulting product, that improvement which comprises ammoniating the superphosphate with a solution of calcium nitrate in an ammoniacal liquid, containing a proportion of ammonia to water corresponding to about 30% or stronger aqua ammonia and an amount of calcium nitrate which substantially saturates said solution with calcium nitrate at a temperature between about −30° C. and about 30° C.

2. A process for producing a fertilizer which comprises treating superphosphate with an ammoniacal solution of calcium nitrate containing about 45 parts of calcium nitrate to about 40 to 55 parts of ammonia and sufficient water to make a total of 100 parts of solution, said solution being added in proportions of about 45 parts of ammonia to every 1000 parts of superphosphate.

3. A process for producing a fertilizer which comprises treating superphosphate with an ammoniacal solution of calcium nitrate containing about 45 parts of calcium nitrate to about 40 to 55 parts of ammonia and sufficient water to make a total of 100 parts of solution, said solution being added in amount sufficient to impart to the resulting fertilizer, without substantial reversion of soluble phosphate, a greater content of nitrogen than may be added by ammoniation only.

4. A process for producing a fertilizer which comprises treating superphosphate with an ammoniacal solution of calcium nitrate substantially saturated with the calcium nitrate, said solution being added in proportions of about 45 parts of ammonia to every 1000 parts of superphosphate.

5. A process for producing a fertilizer which comprises treating superphosphate with an ammoniacal solution of calcium nitrate substantially saturated with the calcium nitrate, said solution being added in amount sufficient to impart to the resulting fertilizer, without substantial reversion of soluble phosphate, a greater content of nitrogen than may be added by ammoniation only.

WALTER H. KNISKERN.
LEONARD V. ROHNER.